United States Patent [19]
> Lutz et al.

[11] 4,018,476
[45] Apr. 19, 1977

[54] AUTOMOBILE SLIDING ROOF WITH TRANSPARENT PANEL AND SHUTTER

[75] Inventors: Alfons Lutz, Emmering; Hans Jardin, Krailling, both of Germany

[73] Assignee: Webasto-Werk W. Baier KG, Stockdorf near Munich, Germany

[22] Filed: Nov. 24, 1975

[21] Appl. No.: 634,444

[30] Foreign Application Priority Data

Jan. 24, 1975 Germany .................... 2502775

[52] U.S. Cl. .................... 296/137 F; 49/63
[51] Int. Cl.² .................... B60J 7/00
[58] Field of Search ........ 296/137 R, 137 E, 137 F, 296/137 G, 137 J; 49/63, 46; 98/2.14

[56] References Cited
UNITED STATES PATENTS

| | | | |
|---|---|---|---|
| 2,193,607 | 3/1940 | Votypka | 296/137 F |
| 3,033,608 | 5/1962 | Golde | 296/137 J X |
| 3,212,812 | 10/1965 | Kurtz | 296/137 B |

FOREIGN PATENTS OR APPLICATIONS

| | | | |
|---|---|---|---|
| 2,319,063 | 10/1974 | Germany | 296/137 F |
| 578,247 | 5/1933 | Germany | 98/2.14 |

*Primary Examiner*—Joseph F. Peters, Jr.
*Assistant Examiner*—Michael J. Forman
*Attorney, Agent, or Firm*—Otto John Munz

[57] ABSTRACT

An automobile sliding roof structure in which a transparent sliding roof panel is associated with an independently retractable opaque canopy panel and where the vertical gap between the roof panel and the roof frame is covered by a U-shaped shutter, moving with the roof panel, but not pivoting with the latter, and by a transverse stationary shutter at the rear of the opening, while skirt portions extending downwardly from the roof panel frame close the gaps between the two shutter elements and the roof panel.

10 Claims, 6 Drawing Figures

AUTOMOBILE SLIDING ROOF WITH TRANSPARENT PANEL AND SHUTTER

BACKGROUND OF THE INVENTION

1. Field of the Invention

The present invention relates to sliding roof structures for automobiles, and more particularly to sliding roof structures having a transparent rigid movable sliding roof panel and an opaque independently movable canopy panel arranged underneath the sliding roof panel, whereby the roof opening is exposable in the usual manner by lowering the rear portion of the sliding roof panel and by retracting the latter underneath the stationary roof portion, and the transparent canopy panel is similarly retractable, while the sliding roof panel remains closed, so that the latter performs the function of a skylight.

2. Description of the Prior Art

Sliding roof structures of the type mentioned have the advantage that they serve a dual purpose, being operable, on the one hand, like a conventional sliding roof, when both the sliding roof panel and the canopy panel are retracted in an opening motion which is similar to that known from conventional rigid sliding roof panels constructed of sheet metal, while on the other hand, a retraction of the canopy panel alone exposes the interior of the automobile to the light falling through the closed transparent sliding roof panel. The amount of light coming through this "skylight" can be conveniently adjusted by appropriating positioning the opaque canopy panel.

Known sliding roof structures of this kind, however, have been found to suffer from an aesthetic disadvantage, in that the retraction of the canopy panel exposes to view from underneath the guide shoes, lifting linkages, and other mechanism portions which surround the transparent sliding roof panel and which are necessary for the opening and closing procedure.

SUMMARY OF THE INVENTION

It is a primary objective of the present invention to provide an improved sliding roof structure of the above-mentioned type in which the indicated shortcoming is effectively eliminated, so that the closed transparent sliding roof panel has a pleasing, aesthetic appearance from underneath, when the canopy panel is retracted.

The present invention proposes to attain the above objective, by suggesting an improved sliding roof structure in which a U-shaped shutter is attached to the lower side of the sliding roof panel, the shutter covering primarily the front edge portion of the panel, having lateral arm portions extending underneath the lateral portions of the panel. This shutter is vertically retained by lateral guides, as it moves with the sliding roof panel, vertical portions of the shutter reaching upwardly as closely to the sliding roof panel as possible, while allowing for the limited pivoting motion of the sliding roof panel which is necessary when the rear portion of the latter is lowered out of, or raised into the roof opening. This pivoting freedom is obtained through a flexural attachment between the front portions of the roof panel and shutter.

The novel shutter thus hides from the view of the vehicle occupants the earlier-mentioned elements of the sliding roof mechanism which surround the sliding roof panel and which would otherwise be visible, when the sliding roof panel is closed and the canopy panel is retracted. Both the shutter and the canopy panel, which is arranged immediately thereunder, move in parallel guides, only the transparent sliding roof panel become tiltable downwardly for the opening motion. As stated, the latter necessitates a limited relative pivotability between the roof panel and the canopy panel.

In order to also eliminate the appearance problem which is posed by the wedge-shaped gap resulting from this relative pivotability, the preferred embodiment of this invention further features a skirt-like frame on the rear and lateral borders of the transparent roof panel, whereby upwardly extending wall portions of the skirt overlap each other. In the area of the forward edge of the roof panel, the skirt frame is preferably that part of the roof panel assembly to which the forward portion of the shutter is attached and which also carries the lateral guide shoes for the roof panel. The shutter, in turn, preferably extends partially around this skirt frame, thereby serving as a conveniently protective and aesthetically pleasing corner profile.

The longitudinal guides for the guide shoes at the front end of the roof panel, the shutter guides, and the guides for the sliding and lifting mechanism at the rear of the roof panel, are all parallel, being preferably combined, or at least closely adjacent to each other. For assembly purposes, it was found to be desirable to provide the shutter guide cover in the form of two separate longitudinally adjacent guide cover segments. As a precaution against the possibility that the lateral arms of the shutter should get caught on the joint between these two profile portions, it is further suggested that these lateral arms be extended rearwardly to a point, where their rear extremities are always located beyond the guide cover gap.

According to a still further advantageous feature of the invention, the preferred embodiment also suggests a stationary shutter extending transversely underneath the rear edge portion of the movable roof panel, so as to vertically overlap the skirt portion in this area, while allowing the latter to be lowered with the roof panel and to move away from the stationary shutter into a retracted open roof position. This stationary shutter is attached to a cross support located just above the retractable canopy panel. Thus, while the U-shaped shutter moves longitudinally with the roof panel, the stationary shutter remains in place, extending transversely between the vertical leg portions of the shutter arms. The result of this arrangement is, that when the transparent sliding roof panel is closed and the opaque canopy panel is fully opened, only the U-shaped shutter profile and the stationary shutter are exposed to view, surrounding the "skylight" as a rectangular frame, while the skirt frame on the movable panel itself fills the wedge-shaped lateral gaps and the rectangular rear gap between the shutters and the roof panel.

The sliding roof structure embodying this invention may have a bridge member connected to the sliding roof panel, which bridge member is arranged below and to the rear of the panel, being connected thereto by means of suitable lifting linkages which produce the tilting motion of the movable panel from a horizontal motion of the bridge member in a well known manner. This bridge member, driven preferably by a so-called push-pull cable, would normally come to partially underly the roof panel. The invention, however, proposes to expose a maximum area of the roof panel, by arranging the bridge member further to the rear of the structure, behind the transverse stationary shutter. A normally necessary slotted guide tube for the push-pull cable can then be arranged to extend through the bridge member to the stationary shutter, where a guide tube mount, attached to the shutter support, serves to stabilize the front end of the guide tube. This arrangement conveniently positions the front end of the guide tube which would otherwise tend to sway, when the bridge member is at or near its rear end position.

Lastly, the preferred embodiment of the invention suggests a way of positively preventing the lowered retracted sliding roof panel from being lifted under vibration or wind influence, thus precluding both rattling and the possible scratching of the roof panel. This is accomplished by arranging a vertical entry gap in the guide profile for the bridge member, so that a suitable holddown skate, attached to the rear edge of the sliding roof panel, can enter the guide profile, as the roof panel is lowered.

BRIEF DESCRIPTION OF THE DRAWINGS

Further special features and advantages of the invention will become apparent from the description following below, when taken together with the accompanying drawings, which illustrate, by way of example, a preferred embodiment of the invention, represented in the various figures as follows.

DESCRIPTION OF THE PREFERRED EMBODIMENT

Figure 1:
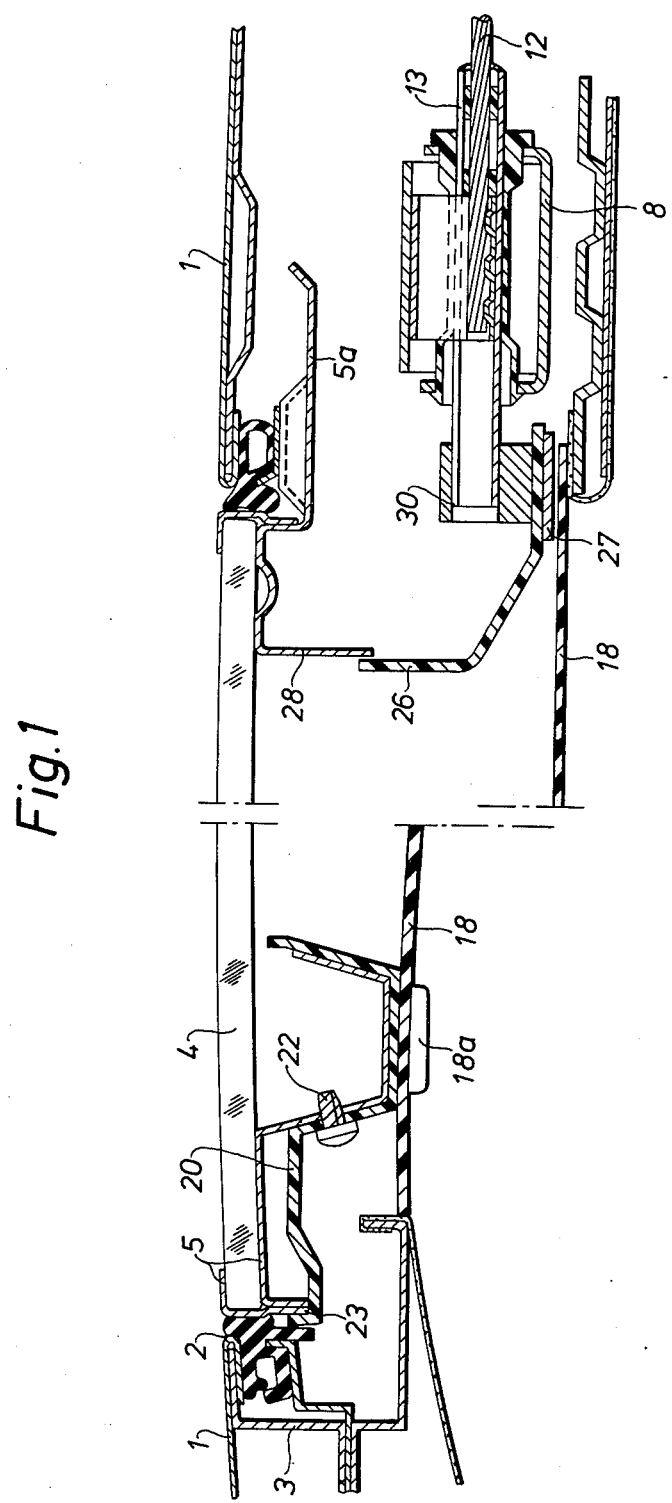
FIG. 1 is an elevational longitudinal cross section, showing a sliding roof mechanism embodying the present invention, the cross section being taken approximately centrally through an automobile roof.

Referring to FIG. 1, there can be seen a stationary roof portion 1 which defines a generally rectangular roof opening 2, the latter being surrounded by a roof frame 3. A rigid sliding roof panel 4 of transparent material is engaged in the roof opening 2 so as to close the latter. The transparent roof panel 4 may be clear or translucent, the border of the panel being enclosed within a panel frame 5. The illustration of FIG. 1 is a longitudinal cross section, the forward portions of the assembly being shown on the left and the rear portions being shown on the right.

Figure 2:
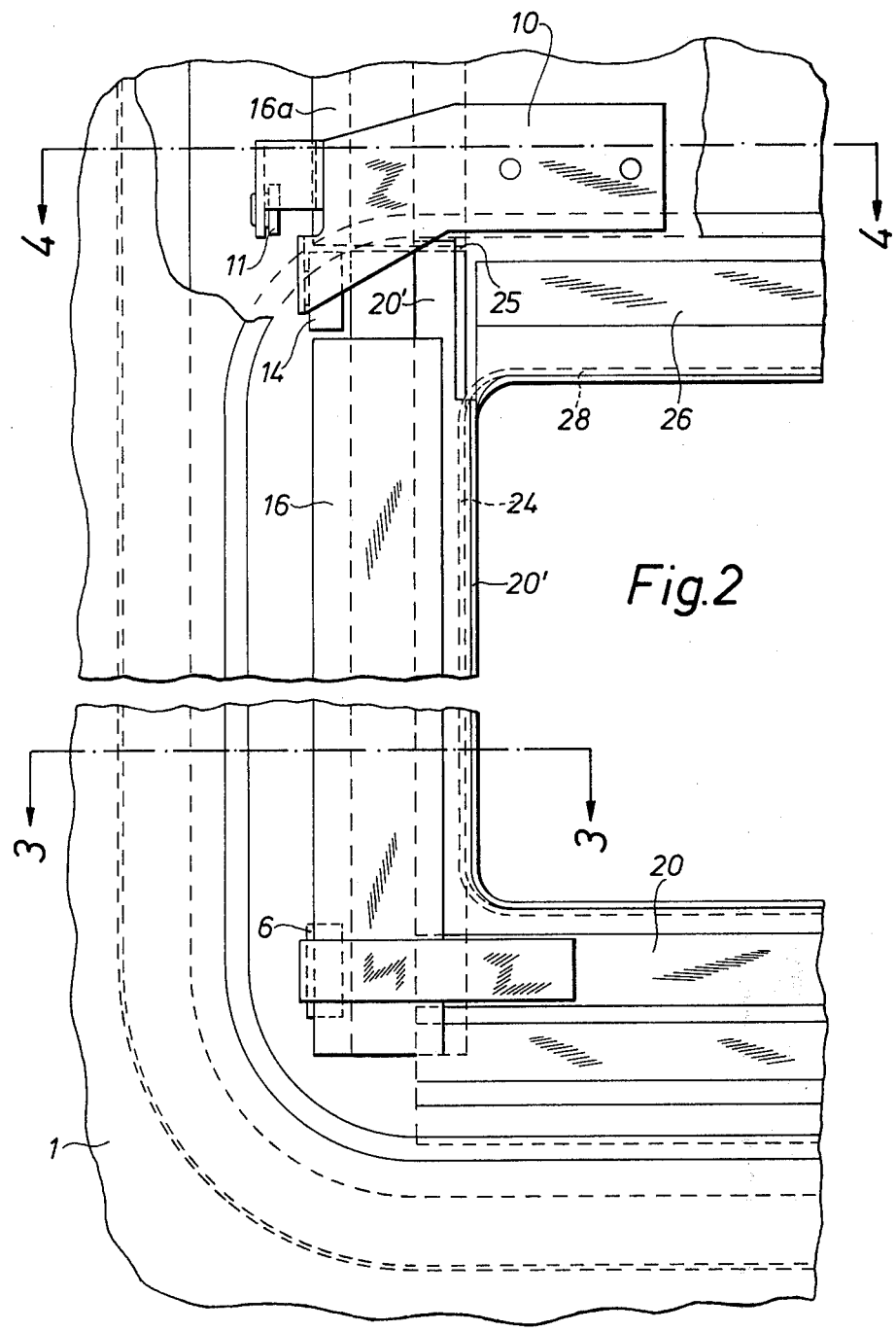
FIG. 2 shows in a plan view the right side of the mechanism of FIG. 1, the sliding roof panel itself being removed, while portions of the stationary roof structure are cut away.
Figure 3:
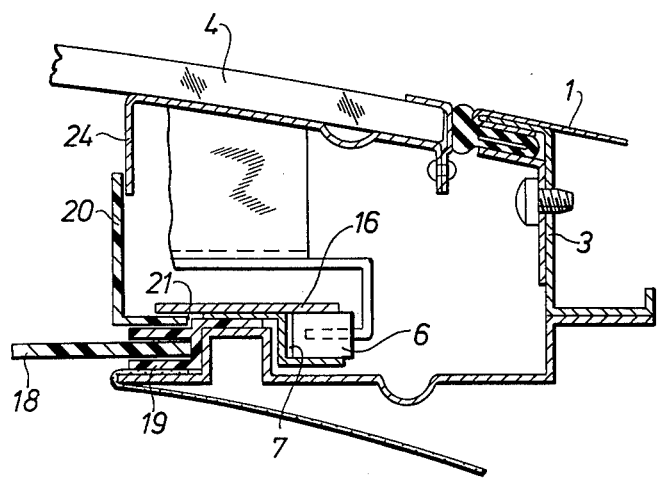
FIG. 3 is a transverse cross section taken along line 3—3 of FIG. 2.
Figure 4:
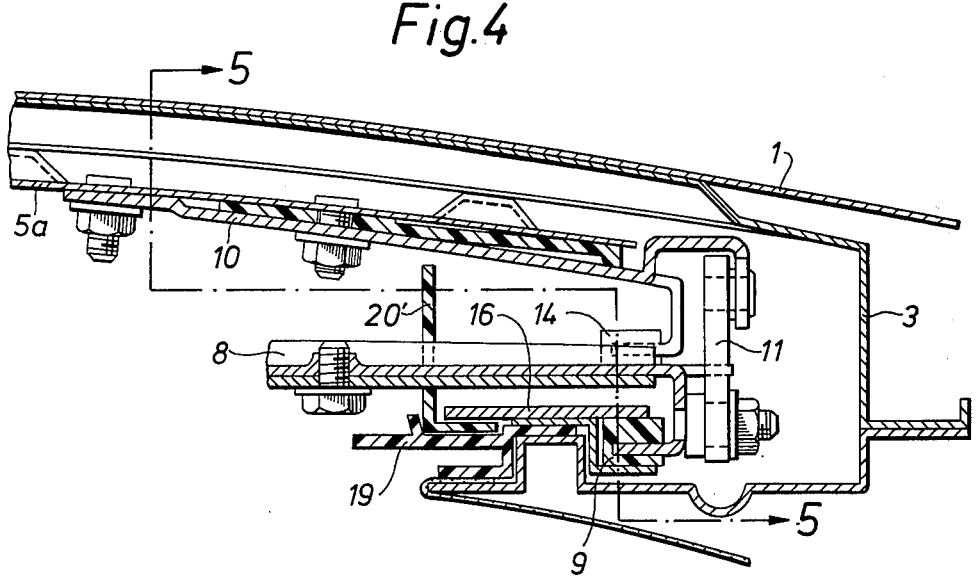
FIG. 4 is a similar transverse cross section taken along line 4—4 of FIG. 2.

The rectangular outline of the roof opening 2 can be clearly seen in FIG. 2, where the right-hand side of the assembly, minus the roof panel 2, is shown in a plan view. There, and in the transverse cross section of FIG. 3, it can be seen that the front portion of the sliding roof panel carries laterally extending guide shoes 6 engaging a longitudinal panel guide 7 which is attached to the lateral portions of the roof frame 3 (FIG. 3). The rear portion of the sliding roof panel 4 is supported by and connected to a transversely extending bridge member 8 (see FIGS. 1 and 5), a rearwardly extending portion of the panel frame 5 forming a rain channel 5a. To this rain channel is bolted a pair of brackets 10, extending downwardly from the rain channel 5a. Suitable lifting linkages 11 connect the brackets 10 with the bridge member 8 (FIG. 5), the latter being longitudinally movable and guided for such motion by means of bridge guide shoes 9, engaging the panel guide profile 7.

The longitudinal movement of the bridge member 8 is preferably obtained by means of a push-pull cable 12 (FIG. 1), the cable being guided inside a longitudinally slotted guide tube 13 whose rear extremity (not shown) is attached to the stationary roof portion 1. If the sliding roof panel is to be opened, the bridge member 8 is moved rearwardly by means of the push-pull cable, whereby the lifting linkage 11 (FIG. 5) first causes the rear portion of panel 4 to be lowered out of the roof opening 2, whereupon panel 4 moves rearwardly with the bridge member 8, the lowered sliding roof panel 4 fitting under the rearwardly adjacent stationary roof portion 1. Any accidental lifting of panel 4 through upward pivoting of the lifting linkage 11, is positively prevented by means of suitable holddown skates 14 (FIG. 5) which, when the panel 4 is lowered, enter the panel guide 7 through a gap 15 in the guide cover 16. The skates 14 thus prevent the retracted roof panel 4 from rattling at its connection with the bridge member and from receiving scratches through contact with the stationary roof portion 1.

In FIG. 1, is further illustrated a generally flat horizontal canopy panel 18, arranged underneath the transparent sliding roof panel 4. The canopy panel 18 is opaque, in order to control the entry of light through the closed transparent panel 4. For this purpose, the canopy panel 18 is longitudinally slidable between a closed position, as shown, and an open, retracted position in which the closed panel 4 is exposed from underneath, so that light may enter the automobile from above. The mobility of the canopy panel 18 is provided by means of lateral canopy guides 19 (FIG. 3) which are parallel to and associated with the panel guides 7.

Figure 6:
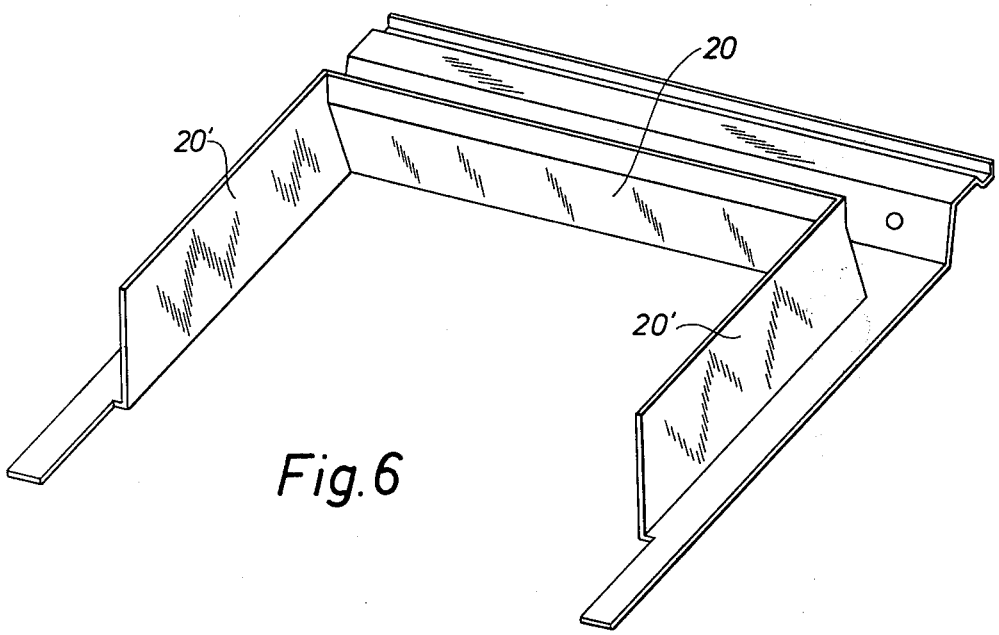
FIG. 6 shows in a perspective view the U-shaped shutter of the invention.

Also attached to the sliding roof panel 4, through the intermediate of panel frame 5, is a U-shaped shutter 20 which is separately illustrated in FIG. 6 of the drawing. The channel-shaped transverse front portion of the shutter 20 extends along the front portion of the roof panel 4 (FIG. 1), while two L-shaped arms 20' extend underneath the lateral edges of panel 4. However, whereas the roof panel 4 itself is arranged for a pivoting motion about its front end, the shutter 20 does not execute such a motion, but is longitudinally guided with respect to the roof structure, the horizontal leg portion of the shutter arms 20' engaging a shutter guide 12 (FIG. 3). The shutter guide 21 is arranged immediately above the canopy guide 19, forming a guide assembly with the panel guide 7. The upstanding leg portions of the shutter arms 20' reach upwardly toward the transparent sliding roof panel 4, a wedge-shaped gap between the shutter arms and panel 4 being necessary to accommodate the downward tilting motion of the latter. This relative motion between panel 4 and shutter 20 is made possible, because the attachment between the two parts is restricted to their forward edges, where screws 22 (FIG. 1) clamp the transverse channel portion of the shutter 20 to a matching transverse channel portion of the panel frame 5. The shutter 20 also conveniently includes a forward extension reaching around the front bottom edge 23 of the panel frame 5, thereby providing a smooth protective edge for the latter, when the sliding roof is in an open position, and which additionally enhances the overall appearance of the assembly.

Since the earlier-mentioned wedge-shaped gap between the upper edges of the shutter arms 20' and the sliding roof panel 4 is detrimental to the overall appearance of the sliding roof structure, the preferred embodiment of the invention further provides mean for closing this gap. This is accomplished by arranging near the edges of the transparent sliding roof panel 4 suitable extensions of the panel frame 5 in the form of downwardly extending skirts. FIG. 3 shows such an extension in the form of a lateral skirt portion 24 forming a short overlap with the shutter arm 20' in the closed panel position. A similar rear skirt portion 28 is arranged at the rear of panel 4. The lateral skirt portions and the rear skirt portion are integral portions of a sheet metal stamping which also includes the rain channel 5a and the transverse channel profile to which the shutter 20 is attached.

Figure 5:
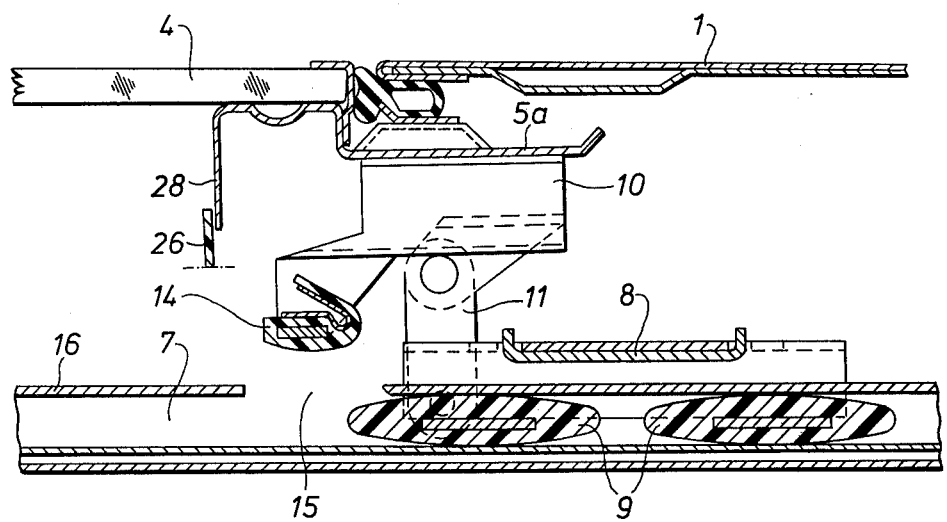
FIG. 5 is a longitudinal cross section taken along line 5—5 of FIG. 2.

Since the U-shaped shutter covers only three sides of the structure which is exposed when the canopy 18 is retracted, the invention provides for an additional stationary shutter 26 to cover the fourth side, shutter 26 being mounted underneath the rear edge of the roof panel 4 (FIGS. 1 and 5). The shutter 26 has a stretched L-shaped configuration, its vertical leg portion extending upwardly toward panel 4, leaving an appropriate gap for the opening movement of the latter, while its horizontal leg portion is attached to a cross support 27, located underneath the edge of the stationary roof portion 1, thereby forming a gap through which the canopy panel 18 moves rearwardly, when opened. The latter, when fully opened, exposes a maximum area of the transparent sliding roof panel 4, surrounded on three sides by the movable shutter 20 and on the fourth side by the stationary shutter 26, with the skirt portions 24 and 28 covering the remaining gap between the shutters and the roof panel 4.

The arrangement of the stationary shutter 26 on the cross support 27 underneath the rear edge of the roof opening 2 thus requires that the bridge member 8, to which the rear portion of panel 4 is connected, is positioned further to the rear of the assembly. This position makes it possible, however, to arrange on the cross support 27 an additional guide tube mount 30 (FIG. 1) which positions the guide tube 13 of the push-pull cable 12. This guide tube, which is normally attached only near its rear extremity, is now held on both extremities, thereby preventing any swinging or vibration on its front end, when the push-pull cable 12 and the bridge member 8 are in their extreme rear position. The longitudinally slotted guide tube 13 extends through the bridge member 8, a cable lug and a coupling sleeve connecting the push-pull cable 12 to the bridge member 8.

For reasons of assembly convenience, the gap 15 in the guide cover 16 (FIG. 5) is created by providing the guide cover in the form of two separate guide sections 16 and 16a (FIG. 2). But, since the guide cover 16 also guides the horizontal leg portion of the shutter arm 20' during its rearward motion, there would exist the risk that the edge of the shutter arms 20' could interfere with the forward edge of the cover portion 16a at 25. In order to prevent this, the shutter arms 20' are extended rearwardly beyond the point 25, so as to always engage the rear cover sections 16a.

It should be understood, of course, that the foregoing disclosure describes only a preferred embodiment of the invention and that it is intended to cover all changes and modifications of this example of the invention which fall within the scope of the appended claims.

We claim the following:

1. In a sliding roof structure for automobiles having a generally horizontal sliding roof panel closing a generally rectangular opening in the roof structure, from which opening said panel is removable by means of an opening mechanism which lowers the rear portion of the panel in a pivoting motion about its front edge and retracts the lowered panel underneath the adjacent stationary roof portion, a sliding roof assembly comprising in combination:

a transparent rigid sliding roof panel serving as a skylight in the closed position;

a roof frame extending along at least the front and side edges of the roof opening underneath the latter;

panel guides defined by the roof frame and extending substantially horizontally on both sides of said roof panel, the guides being engaged by guide shoes mounted on the forward portion of the roof panel;

a generally horizontal opaque canopy panel arranged a distance underneath the sliding roof panel and engaging the roof frame surrounding the roof opening, so as to serve as a closing member or blind to control the amount of light entering through the roof panel;

laterally spaced canopy guides supporting the canopy panel for longitudinal displacement therealong independently of the roof panel, so that the canopy can be opened while the transparent roof panel remains closed; and shutter means arranged in the space between the roof panel and the canopy panel underneath at least the lateral roof panel edges for covering from view at least a major portion of the roof frame and associated structural elements; the shutter means being connected to the roof panel so as to follow the longitudinal opening and closing motions of the latter;

laterally spaced shutter guides engaged by the shutter means during its longitudinal movement, the shutter means being thus prevented from executing the pivoting motion of the roof panel; and wherein the shutter means being pivotably connected to the roof panel in the vicinity of the axis about which the roof panel is pivotable.

2. A sliding roof assembly as defined in claim 1, wherein the connection between the roof panel and the shutter means includes a flexural pivot connection.

3. A sliding roof assembly as defined in claim 1, wherein the shutter means comprises a U-shaped shutter member which includes a transverse shutter portion extending underneath the forward edge of the roof panel and two shutter arms extending rearwardly under the lateral edges of the roof panel; and the shutter member has upwardly oriented wall portions on its inner perimeter, which wall portions cover three sides of said roof frame, the upwardly oriented wall portions of the shutter arms being spaced vertically from the roof panel a distance that corresponds to the space required for the downward pivoting motion of the roof panel, when it is opened.

4. A sliding roof assembly as defined in claim 3, further comprising
a roof panel frame attached to the transparent roof panel; and
skirt means defined by said roof panel frame for covering the vertical gap which remains between the shutter arms and the roof panel, when the latter is in its closed position; the skirt means including vertical wall portions forming an overlap with the upwardly oriented wall portions of the shutter arms.

5. A sliding roof assembly as defined in claim 4, wherein
the roof panel frame further includes a transversely extending frame profile near the forward edge of the roof panel;
the transverse portion of the shutter member is connected to said frame profile by means of said pivot connection; and
the transverse portion of the shutter further includes a profile extension forming a protective front edge on the roof panel, in cooperation with the roof panel frame.

6. A sliding roof assembly as defined in claim 4, wherein
the shutter arms have an L-shaped cross section with a horizontally outwardly oriented leg portion and a vertically upwardly oriented leg portion;
the shutter guides engage said outwardly oriented leg portions of the shutter arms; and
the canopy guides are arranged coextensive with the shutter guides, just below the latter.

7. A sliding roof assembly as defined in claim 4, further comprising
a transversely oriented stationary shutter profile mounted on the roof frame so as to extend underneath the rear edge of the roof panel in the space between the latter and the canopy panel; and wherein
said shutter profile includes an upwardly oriented wall portion which is complementary to said three wall portions of the shutter member, the four wall portions thus forming a rectangular cover frame underneath the roof opening;
the upwardly oriented wall portion of the shutter profile is spaced vertically from the roof panel a distance that corresponds to the space required for the downward pivoting motion of the roof panel, when it is opened; and
the skirt means includes a rear skirt portion extending downwardly from the roof panel frame, just behind the vertical wall portion of the shutter, so as to form an overlap with the latter.

8. A sliding roof assembly as defined in claim 7, further comprising, as part of said opening mechanism;
a longitudinally movable transverse bridge member arranged below and behind the rear edge of the sliding roof panel, but above the level of the canopy panel;
lifting linkages connecting the bridge member to said roof panel edge; and
a push-pull cable attached to, and extending rearwardly from the bridge member, said cable being guided inside a fixed guide tube; and wherein
the stationary shutter includes a cross support which also carries a guide tube mount positioning the forward extremity of said guide tube; and
said cross support extends from side to side between lateral portions of the roof frame, just above the canopy panel.

9. A sliding roof assembly as defined in claim 1, wherein the panel guides, canopy guides and shutter guides are coextensive, forming a compact guide assembly, the panel guides being constituted by outwardly facing grooves, while the canopy guides and shutter guides are constituted by inwardly facing superposed grooves; and
a horizontal guide cover constitutes the upper flanks of a panel guide groove and of a shutter guide groove.

10. A sliding roof assembly as defined in claim 9, wherein
the roof panel further includes a pair of holddown skates attached to its rear portion in alignment with the panel guide grooves, at such a distance below the panel that the skates engage said grooves in the lowered panel position;
the guide cover has a gap for the entry of the holddown skates into the panel guide grooves;
the gap in the guide cover is formed by two longitudinally spaced guide cover sections; and
that portion of the shutter means which engages the shutter guide groove extends so far to the rear that it reaches beyond said gap, when the roof panel is in its closed position.

* * * * *